United States Patent [19]

Mackay et al.

[11] 4,337,055
[45] Jun. 29, 1982

[54] DRIVE BELT TENSIONING APPARATUS

[75] Inventors: Duncan R. Mackay, Mountain View; Arthur K. Arnold; Donald C. Holm, both of San Jose, all of Calif.

[73] Assignee: Autotron Equipment Corporation, Mountain View, Calif.

[21] Appl. No.: 128,943

[22] Filed: Mar. 10, 1980

[51] Int. Cl.³ .......................... F16H 7/12; F16H 7/10
[52] U.S. Cl. .................................. 474/111; 474/140
[58] Field of Search ............................. 474/111, 140

[56] References Cited

U.S. PATENT DOCUMENTS

| | | | |
|---|---|---|---|
| 1,579,681 | 4/1926 | Weller | 474/111 |
| 2,117,195 | 5/1938 | McKerlie | 474/140 |
| 3,673,884 | 7/1972 | Southiere | 474/111 |
| 4,030,376 | 6/1977 | Baudoin et al. | 474/111 |

FOREIGN PATENT DOCUMENTS

| | | | |
|---|---|---|---|
| 110868 | 5/1964 | Czechoslovakia | 474/111 |
| 675019 | 6/1952 | United Kingdom | 474/111 |

*Primary Examiner*—Lawrence J. Staab
*Attorney, Agent, or Firm*—Flehr, Hohbach, Test, Albritton & Herbert

[57] ABSTRACT

A belt tensioning apparatus for tensioning a belt that extends between a driving shaft and driven shaft which are immovably supported with respect to one another. There is a flat spring, the free end of which bears against one run of the belt at a point between the two shafts. The opposite end of the spring is rigidly fixed so as to orient the spring within the plane of the belt such that the spring elastically deflects the belt run into a taut condition. A second leaf spring supported for cooperation with another belt run. Plural flat springs backing up the first mentioned springs for increasing the force applied thereby to the belt runs.

3 Claims, 3 Drawing Figures

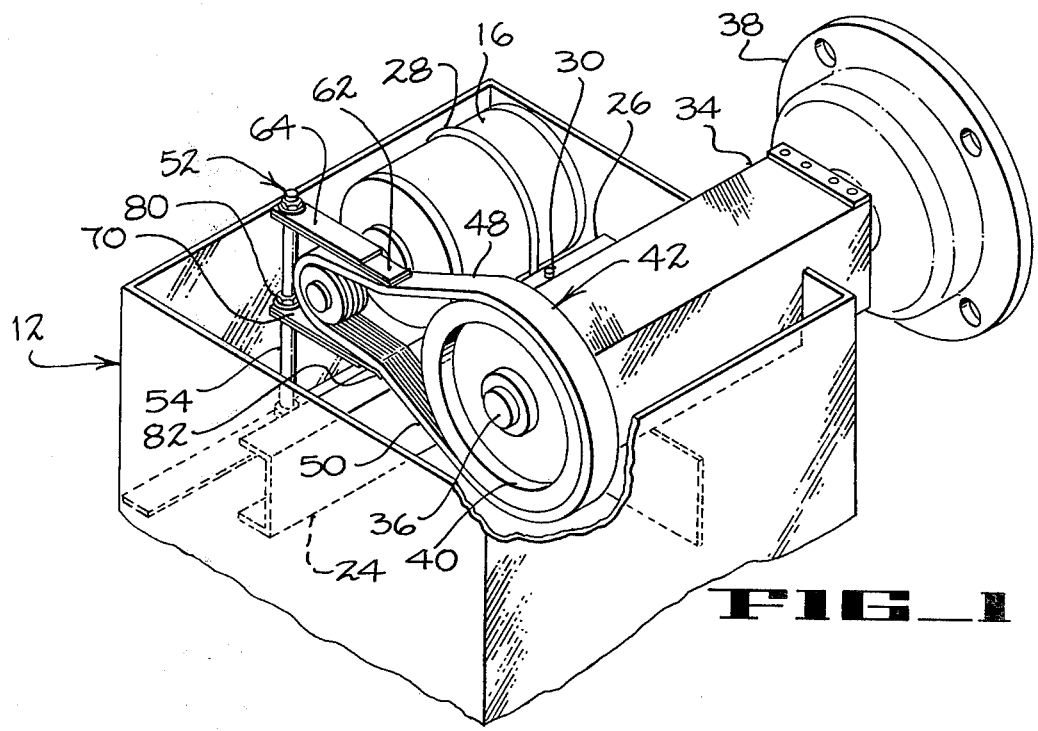
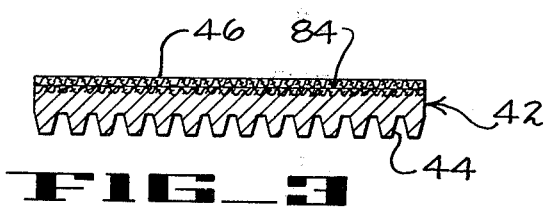
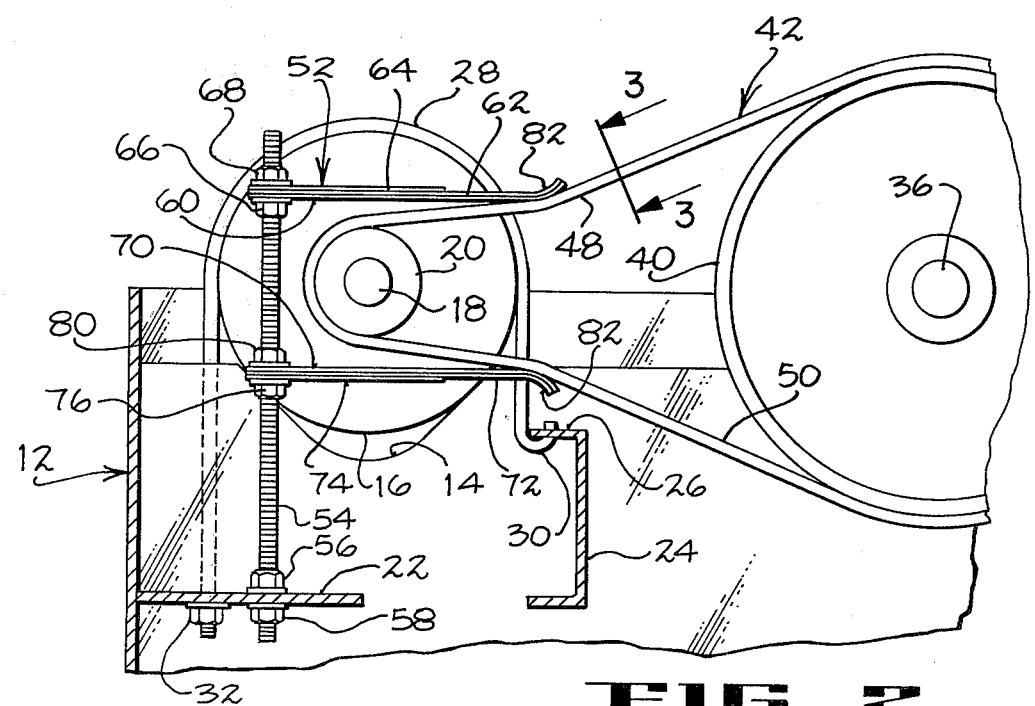

DRIVE BELT TENSIONING APPARATUS

BACKGROUND OF THE INVENTION

1. Field of the Invention

This invention relates to apparatus for applying tension to a drive belt and more particularly to belt tensioning apparatus useful in drive systems for transmitting power between two immovable shafts.

2. Description of the Prior Art

In power transmission systems wherein two shafts are relatively immovably supported, it is necessary to provide mechanism for tensioning the belt under all expected load conditions. One system widely used includes an idler roller and some form of mechanism that urges the roller into contact with the belt surface to tension the belt and remove the slack therefrom. The roller support mechanism in such devices is typically composed of numerous parts which require substantial adjustment, maintenance and replacement. Such systems are particularly complex when it is desired to provide a belt tensioning system that is adjustable, i.e., is intended for adaptation to numerous belt drive systems carrying different loads.

SUMMARY OF THE INVENTION

According to the present invention, one or more flat elongate leaf springs is provided. One end of the leaf spring is supported rigidly with respect to the frame on which the driving and driven shafts are journalled, and the other end of the leaf spring contacts the external surface of a run of the belt between the sheaves mounted on the respective shafts to resiliently deflect the belt inward of a straight line path between the peripheries of the sheaves and to tension the belt. In a preferred form of the invention there are two such leaf springs and mounts therefor so as to effect tension on two belt runs.

An object of the invention is to provide an extremely simple, inexpensive and trouble free belt tensioning system. This object is achieved by forming the principal tensioning elements of flat steel spring stock and mounting the elements so that the free ends thereof rub against a surface of the belt.

Another object is to provide a simplified belt tensioning system which is adjustable to accommodate different loading situations. This object is achieved by providing additional flat springs which are placed in backing up relation to the first mentioned spring and permits addition of as many additional spring layers as are needed to produce the desired force.

Still another object is to provide a belt tensioning system which can be conveniently mounted in a relatively small volume. This object is achieved because the leaf springs that cooperate with two opposite belt runs are mounted on one threaded rod. A feature and advantage of mounting the springs by means of a threaded rod is that virtually infinite adjustment of the load imposed by the springs on the belt runs can be achieved.

A further object of the invention is to provide a belt tensioning system that avoids significant wear on the belts with which it is used. This object is achieved by providing on the extremity of the flat springs that rub against the belt runs an arcuate portion which defines a smooth convex surface that contacts the belt.

Still another object of the invention is to provide an improved belt having a surface that is strong, flexible and substantially wear resistant. This object is achieved by applying to the exterior surface of the belt against which the above mentioned flat springs rub a layer of fabric, such as woven nylon or the like, a material that has high resistance to abrasion.

The foregoing together with other objects, features and advantages will be more apparent after referring to the following specification and the accompanying drawings.

BRIEF DESCRIPTION OF THE DRAWINGS

FIG. 1 is an isometric view of a belt drive system equipped with the tension apparatus of the invention.

FIG. 2 is a side view of the apparatus of FIG. 1 at slightly enlarged scale.

FIG. 3 is a cross-sectional view taken along line 3—3 of FIG. 2 and showing a belt that is particularly suitable for use with the mechanism of the invention.

DESCRIPTION OF THE PREFERRED EMBODIMENT

The apparatus shown in the drawings to exemplifiy a suitable environment for the invention is a wheel balancing machine of the type employed in tire shops, service stations and the like. The belt tensioning system of the invention is not limited to such apparatus.

Referring more particularly to the drawings, reference numeral 12 indicates a base which defines a generally V-shaped motor support cradle 14. A motor 16 is supported in the cradle, the motor having a shaft 18 on which is mounted a sheave 20. In the embodiment shown in the drawings sheave 20 has in its peripheral surface a series of V-shaped grooves; such form of sheave is exemplary and not limiting. Rigid with frame 12 and constituting a part thereof is a cross plate 22 and a channel 24. Channel 24 has a horizontally oriented web 26. Motor mounting holes are formed in cross plate 22 and web 26. There is a motor mounting rod 28 having a hook portion 30 at one end for cooperation with the hole in web 26. At the opposite end, rod 28 extends through the hole in plate 22 and has a threaded portion with which is engaged a nut 32. It can be seen that by suitable tightening of nut 32, motor 16 and shaft 18 can be supported in substantially immovable relation to frame 12.

Supported on frame 12 in spaced apart relation to motor 16 is a shaft housing 34. Shaft housing 34 is hollow and supports therein shaft bearings (not shown). Such bearings support a shaft 36 for rotation on an axis parallely spaced from the axis of motor shaft 18. Although the particular load attached to shaft 34 does not limit the present invention, in the device depicted in FIG. 1 the shaft carries a flange 36 on which a vehicle wheel and tire can be attached for use in dynamically balancing such wheel and tire. On the end of shaft 36 opposite from flange 38 and in coplanar relation to motor sheave 30 is a driven sheave 40. The peripheral surface of sheave 40 is similar to that of sheave 20. Trained around driving sheave 20 and driven sheave 40 is a drive belt 42 which, as can be seen in FIG. 3, has a grooved inner surface 44, which engages with complemental grooves on the sheaves, and an outer surface 46 that is flat. As can be seen in FIG. 2, there is an upper belt run 48 between the two sheaves and a lower belt run 50. The tensioning device of the invention, which is identified generally at 52, cooperates with the runs to deflect the runs inward of an imaginary line tangent to the peripheries of the sheaves so as to tension belt 42.

Tensioning device 52 includes a rod 54 which extends through a hole in frame cross piece 22. Rod 54 has a threaded portion at its lower end to which are threadedly engaged an upper nut 56 and a lower nut 58 which are on opposite sides of cross piece 22 and which when tightened support rod 54 rigidly of frame 12. Cross piece 22 and the hole therein are positioned and oriented such that the rod is supported perpendicular to an imaginary line extending between the central axes of shafts 18 and 36. As can be seen in FIG. 1, rod 54 is oriented within a vertical plane extending through belt 42 and sheaves 20 and 40. Above sheave 20 there are mounted on rod 54 a flat leaf spring 60 which is backed up by a second leaf spring 62 that is substantially coextensive with leaf spring 60 and a third leaf spring 64 that is shorter than leaf spring 60. Each of the leaf springs has a first end (at the left as viewed in FIG. 2) in which are formed holes having a diameter substantially the same as the diameter of rod 54 so that the springs can be mounted on the rod. There is a lower nut 66 and an upper nut 68 which are threaded on rod 54 and which are tightened so as to capture leaf springs, 60, 62 and 64 and retain them in face-to-face contact. The vertical position of nuts 66 and 68 and the leaf springs captured thereby is established so as to deflect upper run 48 inward of the above mentioned imaginary line of tangency as well as to elastically deform the leaf springs.

On rod 54 below motor sheave 20 are supported leaf springs similar to those described above. There is a first lower leaf spring 70, a second lower leaf spring 72 and a third lower leaf spring 74. Leaf spring 72 is substantially coextensive with leaf spring 70 and leaf spring 74 is shorter than leaf spring 70. The lower leaf springs have holes to admit rod 54 therethrough and there is a lower nut 76 and an upper nut 80 which are threaded on rod 54 and retain leaf springs 70, 72 and 74 in face-to-face contact and in a position to deflect belt run 50 to the position shown, i.e., inward of an imaginary line of tangency to the periphery of sheaves 20 and 40. It will be noted that the ends of leaf springs 60, 62, 70 and 72 that are remote from rod 54 are provided with arcuate portions 82 which define convex surface portions that rub against the outer surface of belt 42 at runs 48 and 50. It will be appreciated that the length of the leaf springs, that is, the distance from rod 54 to arcuate portions 82, is established such that the convex surfaces formed by the arcuate portions rub against belt runs 48 and 50 at points intermediate sheaves 20 and 40. Moreover, the system is preferably dimensioned such that the portions of the springs on either side of arcuate portions 82 define an acute angle to the belt at the region of contact therebetween.

Operation of a belt tensioning apparatus in accordance with the invention will be described first in connection with installation of the system. After rod 54 is installed by installation of nuts 56 and 58, nut 76 is threaded onto the rod and lower leaf springs 70, 72 and 74 are placed over the rod and on top of nut 76. It should be appreciated that, depending on the size of belt 42 and the loads carried thereby, there can be fewer springs or more springs than shown. In addition, the springs can be formed of relatively heavy guage material or of relatively light guage material depending on the loading conditions and the length of the springs. Next, belt 42 is trained around sheaves 20 and 40 after which nut 76, upper springs 60, 62 and 64 and nut 68 are installed. Finally nuts 66, 68, 76 and 70 are threaded up and/or down rod 54 until the tension is substantially removed from belt 42 and the springs are at least slightly elastically deformed. When the correct belt tension has been established the nuts are secured so that the upper springs and the lower springs are compressed in face-to-face relation as shown.

Because there are spring assemblies cooperating with both upper run 48 and lower run 50, the belt is tensioned irrespective of the direction of rotation to which it is subjected. Additionally, acceleration and deceleration occur smoothly and without vibration because the spring assemblies yield to maintain continuous tension on the belt by maintaining continuous inward deflection of the belt along runs 48 and 50. Continuous maintenance of tension is particularly important in wheel balancing equipment because such equipment typically senses imbalance by load eccentricities about shaft 56 and in such environment freedom from vibration or impulses in the belt drive enhances the accuracy of such equipment.

Although many belts include a fabric portion on or adjacent to flat surface 46 of the belt, it has been found that the provision of a layer of fabric woven of nylon threads 84 affords a long wearing system in cooperation with the convex surfaces formed at the outer ends of the spring assemblies. A belt provided with such fabric layer on the flat surface thereof is extremely long lived and affords insignificant friction between the belt surface and the portion of the leaf springs that bear against the belt surface.

In the foregoing description, a belt with plural internal V-grooves and sheaves that are complementary thereto have been described. Such is not to be considered limiting, however, as the present invention finds equal application in the case of a V-belt, a flat belt or virtually any other type that has a substantially flat exterior surface. For different weights of belt and different loads, the number, length and thickness of the leaf springs can be varied to achieve the amount of tensioning force on the belt as is needed.

Thus it will be seen that the present invention provides a belt tensioning apparatus which is compact, uncomplex, inexpensive and extremely long lived. Moreover, the belt tensioning apparatus is adjustable because the presence of nuts 66, 68, 76 and 80 permit the leaf springs to be installed at any suitable position, depending on the length and stiffness of the springs and the location of rod 54 relative sheave 20.

Although one embodiment of the invention has been shown and described, it will be obvious that other adaptations and modifications can be made without departing from the true spirit and scope of the invention.

What is claimed is:

1. Apparatus for tensioning a drive belt that is trained around a driving sheave mounted on a first shaft and a driven sheave mounted on a second shaft supported substantially immovably in parallel spaced apart relation to said first shaft, said belt having a first and second belt run defined between said sheaves and disposed in spaced relation to each other, said apparatus comprising first and second elongate leaf springs each having a first end and a second end remote from said first end, and first and second spring mounting means for mounting said first end of each said spring substantially immovably with respect to said shafts, said first and second mounting means supporting an associated one of said springs to dispose said second end of said springs in rubbing contact with said belt on said first and second runs respectively and at a site intermediate said sheaves, said mounting means spporting said leaf springs to elastically deform an associated one of said springs and to deflect the belt on an associated one of said runs so as to tension the same, one of said sheaves being of a diameter smaller than the other said sheave and including an elongate rod mounted adjacent said smaller sheave, said elongate rod being spaced from said smaller sheave and being oriented substantially perpendicular to an imaginary line extending through said shafts, both said mounting means fixing the first ends of respective said springs at respective sites on said rod that are disposed on opposite sides of said smaller sheave.

2. Belt tensioning apparatus according to claim 1 wherein said elongate rod has a threaded portion thereon, wherein the first ends of said springs define holes sized to admit said rod therethrough and wherein said mounting means include nuts threadedly engaged with said rod and capturing the first ends of respective said springs.

3. Apparatus for tensioning a drive belt that is trained around a relatively small sheave mounted on a first shaft and a relatively large sheave mounted on a second shaft supported substantially immovably in parallel spaced apart relation to said first shaft, one of said sheaves being a driving sheave and one of said sheaves being a driven sheave, there being first and second belt runs between said sheaves, said apparatus comprising a threaded rod, means for rigidly mounting said threaded rod adjacent said small sheave and in spaced apart relation thereto at the side thereof opposite from said large sheave, first and second elongate leaf springs having first ends defining holes for receiving said threaded rod therethrough, a plurality of nuts threadedly engaged with said rod and retaining the first end of said first spring on one side of said small sheave and the first end of said second spring on the other side of said small sheave, said elongate springs having second ends remote from respective said first ends, said second ends extending substantially parallel to an imaginary line between said shafts and into rubbing contact with respective said belt runs at points intermediate said sheaves, the length of said springs and the position of said first ends as established by the position of said nuts being such as to elastically deform said springs and to deflect the belt on said runs inwardly so as to tension said belt.

* * * * *